United States Patent [19]
Zeldman

[11] 3,762,781
[45] Oct. 2, 1973

[54] ANTI-FRICTION BALL BEARING ASSEMBLY

[75] Inventor: Maurice Irving Zeldman, Pittsburgh, Pa.

[73] Assignee: North American Rockwell Corporation, Pittsburgh, Pa.

[22] Filed: Sept. 8, 1972

[21] Appl. No.: 287,461

[52] U.S. Cl. .................................. 308/6 C, 308/185
[51] Int. Cl. ............................................ F16c 29/06
[58] Field of Search ........................... 308/6 C, 185

[56] References Cited
UNITED STATES PATENTS

| | | | |
|---|---|---|---|
| 2,520,785 | 8/1950 | Schlicksupp | 308/6 C |
| 2,890,594 | 6/1959 | Galonska | 308/6 C |
| 3,446,540 | 5/1969 | Geffner | 308/6 C |

*Primary Examiner*—Charles J. Myhre
*Assistant Examiner*—Barry Grossman
*Attorney*—John R. Bronaugh et al.

[57] ABSTRACT

An anti-friction linear ball bearing assembly adapted for mounting on a shaft to provide omnidirectional load capability between the shaft and a support member, comprising an outer sleeve and an inner sleeve concentrically fitting within the outer sleeve, the inner sleeve having a helical track defining a helical path for the circulation of a number of load carrying balls between said shaft and the bearing assembly, means attaching the ball bearing assembly to the support member.

10 Claims, 3 Drawing Figures

PATENTED OCT 2 1973 3,762,781

ANTI-FRICTION BALL BEARING ASSEMBLY

BACKGROUND OF THE INVENTION

This invention relates generally to an anti-friction linear ball bearing assembly adapted for mounting on a shaft to provide omnidirectional load capability between the shaft and a support member.

In particular, the invention relates to an anti-friction ball bearing assembly adapted for mounting on a shaft to provide anti-friction linear bearing support between the shaft and a support member, comprising an outer sleeve and an inner sleeve concentrically fitting within the outer sleeve, the inner sleeve having a helical track defining a helical path for the circulation of a number of load carrying balls between said shaft and the bearing assembly, means attaching the ball bearing assembly to the support member.

The prior art is replete with different types of anti-friction recirculating linear ball bearing assemblies. Generally in the prior art recirculating linear ball bearing systems are inefficient in the way they react under load. This inefficiency is typically caused by only one or two of the recirculating ball tracks taking the load.

The recirculating ball bearing assemblies are disposed in a relatively fixed position on their associated shafts and therefore the load carrying balls confront the same section or area of the shaft during operation. This, of course, results in eventual scoring of the shaft at those areas confronting the load carrying balls.

Another substantial deficiency of the prior art recirculating ball bearing assemblies is that they must be preoriented with a uni-directional load in order to work at maximum efficiency. This inherent deficiency limits the loading environments to which such prior art recirculating ball bearing assemblies can be adapted.

SUMMARY OF THE INVENTION

Accordingly, it is an object of the present invention to provide an anti-friction ball bearing assembly adapted for mounting on a shaft to provide anti-friction linear bearing support between said shaft and a support member, comprising an outer sleeve and an inner sleeve concentrically fitting within said outer sleeve, the inner sleeve having a helical track defining a helical path for the circulation of a number of load carrying balls between said shaft and said bearing assembly, means attaching said ball bearing assembly to said support member for rotatable movement therebetween.

It is another object of the present invention to provide a highly efficient ball bearing assembly capable of being inexpensively manufactured and being simplistic in design.

Another object of the present invention is to provide an improved anti-friction ball bearing assembly having superior load carrying characteristics without the need to pre-orientate the ball assemblies with the load.

It is still another object of the present invention to provide an improved anti-friction ball bearing assembly which can be manufactured using automated high volume techniques.

It is yet another object of the present invention to provide a superior low noise anti-friction ball bearing assembly.

It is a further object of the present invention to provide a recirculating ball bearing assembly capable of accommodating omnidirectional loads.

It is a still further object of the present invention to provide an improved anti-friction ball bearing assembly in which the bearing assembly rotates with respect to the shaft during operation whereby the various load carrying balls confront different sections or areas of the shaft thereby prolonging the life of both the shaft and the bearing assembly.

Other objects and advantages of the invention will become apparent as the present invention is better understood from the following disclosure and as shown in the accompanying drawings.

DESCRIPTION OF THE INVENTION

Figure 1:
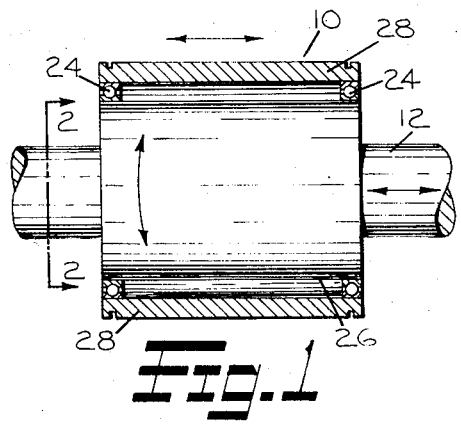
FIG. 1 is a side elevational view partially cut away of an anti-friction ball bearing assembly mounted on a shaft embodying the concept of the present invention.
Figure 2:
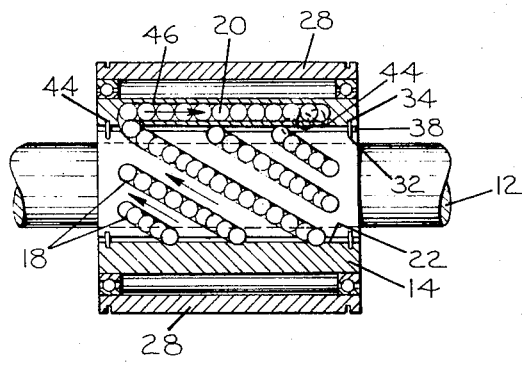
FIG. 2 is a sectional view taken along line 2 — 2 of FIG. 1.
Figure 3:
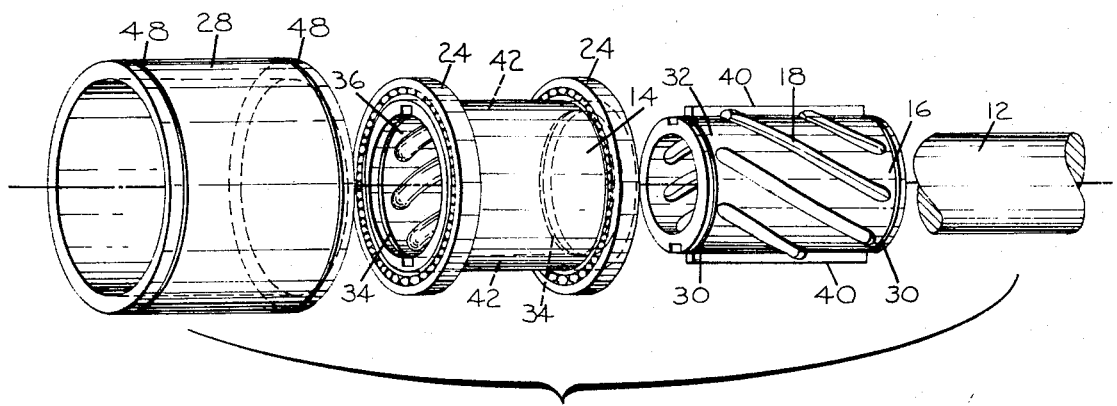
FIG. 3 is an exploded perspective view of the anti-friction ball bearing assembly of FIG. 1 without the load carrying balls.

Referring now to the drawings, there is shown an improved anti-friction ball bearing assembly embodying the concept of the present invention wherein the assembly is generally designated by the numeral 10. The anti-friction ball bearing assembly 10 is particularly adapted for mounting on a shaft 12 to provide anti-friction linear bearing support between the shaft 12 and a support member (not shown).

The anti-friction ball bearing assembly, which is of the recirculating ball type, comprises an outer sleeve 14 and an inner sleeve 16. The inner sleeve 16 is adapted to concentrically fit within the outer sleeve 14. The inner sleeve 16 is provided with a continuous helical track 18 which defines a helical path for the circulation of a number of load carrying balls 20. The load carrying balls 20 circulate between the shaft 12 and the outer sleeve 14, and in particular between the shaft 12 and the inner surface 22 of the outer sleeve.

The anti-friction ball bearing assembly 10 is operatively attached to a support member such as a tooling die member (all not shown) for rotatable movement therebetween. The rotatable movement is achieved by bearing means 24 such as ball bearings which are fitted such as by means of a press fit to the outer surface 26 of the outer sleeve 14.

A third sleeve 28 is concentrically fitted around the outer sleeve 14. The third sleeve 28 is in rotatable bearing contact with the bearing means 24. The inner sleeve 16 is provided with two annular grooves 30 on its outer surface 32, one at each of its ends. The outer sleeve 14 is likewise provided with corresponding annular grooves 34 on its inner surface 36 at each of its ends.

Holding means 38, such as a snap ring or the like, are disposed in the corresponding groove 32 and 34 to hold and maintain the axial positional alignment of the inner sleeve 16 with respect to the outer sleeve 14. The inner sleeve 16 is further provided with at least one axially extending rib or spline member 40. The spline member 40 which may be formed integrally with the inner sleeve 16 is adapted to register with at least one corresponding axially extending groove 42 on the inner surface of the outer sleeve 14. The operative registration of the spline member 40 with its corresponding axially extending groove 42 maintains the radial alignment of the inner sleeve 16 with respect to the outer sleeve 14.

The inner surface 36 of the outer sleeve 14 is cylindrical in shape and provides a raceway surface for the load carrying balls 20. The inner surface 36 or raceway surface could, of course, be coated with a self-lubricating plastic such as polytetrafluoroethylene.

Each end of the track 18 in the inner sleeve 16 is in alignment with a substantially circular aperture 44 in the inner surface of the outer sleeve 14. The apertures 44 are in communication with an axially extending track 46 disposed within the body of the outer sleeve 14. The helical track 18 in combination with the apertures 44 and the axially extending track 46 define a closed-loop path for the recirculation of the load carrying balls 20.

As before mentioned, the antifriction ball bearing assembly in accordance with the present invention can be generally classified as a recirculating ball bearing. It can be seen that as the anti-friction ball bearing assembly 10 moves along the shaft 12, the load carrying balls 20 will tend to roll and circulate in and through the tracks 18 through the apertures 44 and then through the axially extending track 46. The load carrying balls 20 therefore assume two basic positions, an active or loaded position and an inactive or unloaded position. In the active position the balls 20 are provided an anti-friction rolling support between the outer sleeve 14 (and in turn to the support member to which it is eventually attached) and the shaft 12, as the shaft 12 and the ball bearing assembly 10 move with respect to each other.

In the inactive position, the load carrying balls 20 are in effect doing no useful work but are being recirculated to the active position. The load carrying balls 20 will assume their inactive position as they move out of contact with the shaft 12 and into the apertures 44. They will as before mentioned then transit the axially extending track 46 and return to their active position. The load carrying balls 20 of course will circulate in a direction depending upon the relative motion of the ball bearing assembly 10 with respect to the shaft. It can be seen that the load carrying balls 20 in their active position will be moving in a helical path. This movement of the balls with respect to the inner sleeve will tend to impart a rotary motion to the inner sleeve and thus to the outer sleeve 14 to which it is mechanically interlocked by virtue of the axially extending spline members 40. This rotary motion of the outer sleeve 14 will be accommodated by the bearings 24. Accordingly, as the bearing assembly 10 transits the shaft 12, the inner and outer sleeve 16 and 14 respectively and the captured load carrying balls 20 will rotate with respect to the third sleeve 28. The balls therefore will see and confront different areas and sections of the shaft 12 thus reducing the probability of scoring of the shaft and skidding of the balls thereon. Additionally, the ball bearing assembly 10 will also be capable of accommodating omnidirectional loads as may be encountered in "die" applications.

The third sleeve 28 can be fixedly attached to a support member (not shown) by means of annular grooves 48, a holding means such as snap rings could be used to engage these annular grooves 48.

The axially extending spline members 40 serve an additional purpose, that is to maintain the structural integrity of the inner sleeve 16. The width and number of the spline members 40 will of course depend on the overall operational environments to which the anti-friction ball bearing assembly is subjected.

The various components of an anti-friction ball bearing assembly could be manufactured from a wide variety and range of materials using a number of fully automated techniques. For example, the inner sleeve 16, outer sleeve 14 and third sleeve 28 could all be manufactured from steel such as SAE 5200 steel. Additionally, the various surfaces could be suitably coated or treated depending upon application and environment. Assembly of the overall anti-friction ball bearing assembly in a like manner could be accomplished by using advanced automated techniques.

Obviously, the present invention is not limited to the specific details as herein described, but is capable of other modifications and changes without departing from the spirit and scope of the appended claims.

I claim:

1. An anti-friction ball bearing assembly adapted for mounting on a shaft to provide anti-friction linear bearing support between said shaft and a support member, comprising an outer sleeve and an inner sleeve concentrically fitting within said outer sleeve, the inner sleeve having a helical track defining a helical path for the circulation of a number of load carrying balls between said shaft and said bearing assembly, means attaching said ball bearing assembly to a support member for rotatable movement therebetween.

2. An anti-friction ball bearing assembly in accordance with claim 1 wherein said means for attaching said ball bearing assembly to said support member for rotatable movement therebetween comprises at least one bearing means attached to the outer surface of said outer sleeve, a third sleeve concentrically fitting around said outer sleeve and in rotatable bearing contact with said bearing means, said third sleeve being fixedly attached to said support member.

3. An anti-friction ball bearing assembly in accordance with claim 2 wherein said bearing means comprises two ball bearings.

4. An anti-friction ball bearing assembly in accordance with claim 1 wherein said inner sleeve is held in concentric alignment with said outer sleeve, both radially and axially, by first and second holding means respectively.

5. An anti-friction ball bearing assembly in accordance with claim 4 wherein said second holding means comprises at least two annular rings, each disposed in grooves at the ends of the inner surface of the outer sleeve and the outer surface of said inner sleeve.

6. An anti-friction ball bearing assembly in accordance with claim 4 wherein said first holding means comprises at least one spline member integral with said inner sleeve and in interlocking engagement with a corresponding groove on the inner surface of said outer sleeve.

7. An anti-friction ball bearing assembly in accordance with claim 2 wherein the outer surface of the third sleeve is a smooth surface of revolution, two annular grooves disposed at each end of said third sleeve for fixedly attaching said bearing assembly to said support member.

8. An anti-friction ball bearing assembly in accordance with claim 1 wherein the inner surface of the outer sleeve is cylindrical in shape and provides a raceway surface for said load carrying balls.

9. An anti-friction ball bearing assembly in accordance with claim 8 wherein said raceway surface is coated with a self-lubricating plastic.

10. An anti-friction ball bearing assembly in accordance with claim 9 wherein said self-lubricating plastic is polytetra-fluoroethylene.

* * * * *

PO-1050
(5/69)

UNITED STATES PATENT OFFICE
CERTIFICATE OF CORRECTION

Patent No. 3,762,781            Dated October 2, 1973

Inventor(s)     Maurice I. Zeldman

It is certified that error appears in the above-identified patent and that said Letters Patent are hereby corrected as shown below:

On Title Page, [73] Assignee:

Delete "North American Rockwell Corporation" and

Insert--Rockwell International Corporation--.

Signed and sealed this 10th day of December 1974.

(SEAL)
Attest:

McCOY M. GIBSON JR.
Attesting Officer

C. MARSHALL DANN
Commissioner of Patents